3,600,365
POLYESTERS FROM POLYCARBOXYLATES
AND POLYHALIDES
Donnie G. Brady, Bartlesville, Okla., assignor to
Phillips Petroleum Company
No Drawing. Filed Aug. 19, 1969, Ser. No. 851,482
Int. Cl. C08g 17/013, 17/04
U.S. Cl. 260—78.4          14 Claims

ABSTRACT OF THE DISCLOSURE

Preparation of polyesters from organic polyhalides and salts of polycarboxylic acids in effective yield in short reaction times by using, as catalysts, phosphines or quaternary phosphonium salts. The method optionally uses a soluble monohalide with the phosphines for further increases in polyester yield.

---

This invention relates to a method for the preparation of polyesters. In another aspect it relates to catalysts to improve the reactions of organic polyhalides with salts of polycarboxylic acids in the production of polyesters.

Heretofore, polyesters have been prepared by the reaction between dihydric alcohols and dicarboxylic acids, or between dihydric alcohols and dicarboxylic acid anhydrides. A tertiary material, an unsaturate, is needed for cross-linking. Heating is required to initiate the reactions, which are exothermic. Reaction temperatures are usually in the region of about 375 to 400° F. The handling of acids and anhydrides in such reactions often is difficult, requiring specialized corrosion resistant equipment, as well as the necessary provisions for heating to initiate and cooling to control the reactions.

While the reaction of orgaic halides with salts of carboxylic acids has been a textbook method of esterification in the teching of organic chemistry, there has been no practical way to utilize such relatively easily obtained and handled starting materials in the direct preparation of polymers. Direct use of such reactants to produce valuable polyester polymers would be a highly desirable and very commercially-useful process, particularly if such process results in polymers of sufficiently high molecular weights to be useful in the production of molded articles and the like.

I have discovered that the conversion reaction of an alkali metal organic polycarboxylate with an organic polyhalide provides effective yields of polyesters when the reaction is conducted in the presence of certain phosphorous-containing catalysts. Either linear polyesters or cross-linked polyesters can be prepared, as desired, by choice of the polycarboxylate and polyhalide. Cross-linking is obtained without the need for introducing additional cross-linking chemicals into the reaction. While the reactions of the polyfunctional reactants might be expected to form dimers, trimers, and a wide variety of short-chain low-molecular weight end products, I have surprisingly found that my process results in good yields of essentially solid polymer products of sufficiently substantial molecular weights, as shown by inherent viscosities, to be very commercially useful.

More particularly, my method of preparing polyesters provides effective yields, effective rates of conversion, and minimum side reactions. These results are obtained by the use of one or more catalysts prepared from phosphorous, specifically phosphines and quaternary phosphonium compounds. Optionally, according to my invention, the phosphine catalysts can be used with soluble halides as catalyst adjuvants to even further enhance the effectiveness and productivity of my polyester reactions and preparations.

Therefore, it is an object of my process and use of my catalysts to provide for the effective preparation of polyesters from organic polyhalides and salts of polycarboxylic acids. It is a further object of my invention to provide improved methods for increased yields of polyesters by the use of phosphines and quaternary phosphonium compounds as catalysts in the reaction of organic polyhalides with alkali metal polycarboxylates.

The polyester reaction to which I make specific reference is the reaction between an alkali metal polycarboxylate with up to 4 carboxylate groups

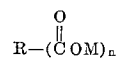

and an organic polyhalide $R^2X_n$ wherein $n$ is an integer from 2 to 4.

Thus, dicarboxylates react with dihalides to produce linear polymers. Tri- or quadri-functional carboxylates or halides or both react to produce cross-linking in the resulting polymer, with the degree of cross-linking dependent upon the amount and value of $n$.

R represents an organic group having from 1 up to 200 carbon atoms and having a valence of $n$. R optionally can contain olefinic unsaturation, carbonyl groups, alkoxy groups wherein the alkyl group can contain as many as 8 carbon atoms, nitrile groups, hydroxy groups, ether linkages, sulfide linkages, nitrogen linkages wherein the nitrogen is bonded only to carbon atoms and not to any hydrogen atoms, and aromatic groups. M is an alkali metal including lithium, sodium, potassium, rubidium, or cesium.

These polycarboxylates as I have defined them can include polycarboxylate-substituted polybutadienes, polycarboxylate-substituted polyethers, and others, including copolymers, encompassed within my defined limits of number of carbon atoms and various linkages. The preparation of such polymers is described in the art, such as in U.S. Letters Pat. 3,315,716 and the like.

In the organic polyhalides represented by $R^2X_n$, $n$ is an integer from 2 to 4. X is a halogen, specifically chlorine, bromide, or iodine. $R^2$ has the same value as R above with the restriction that the halogens are bonded only to primary carbon atoms, i.e., carbon atoms which are bonded to at least two hydrogen atoms, and the number of carbon atoms per $R^2$ group is limited to about 20 carbon atoms as a maximum, and $R^2$ has a valence of $n$.

The phosphine catalysts I employ in my invention can be represented by the generalized formula $R_3{}^3P$ in which $R^3$ is hydrocarbyl and can be alkyl, cycloalkyl, aryl, or combinations thereof such as aralkyl, alkaryl, and the like, containing from 1 to about 8 carbon atoms, P, of course, is phosphorus.

The phosphonium catalysts I use in my invention are quaternary phosphonium salts $[R_4{}^3P]_m Y$ in which $R^3$ is the same as defined hereinabove. Y can be selected from

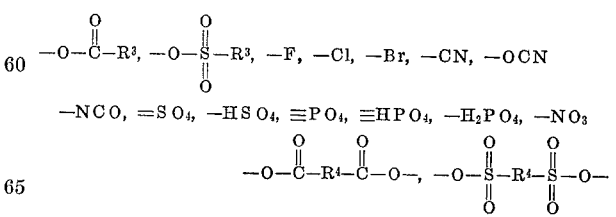

or any other nondeleterious anionic group having a valence of 1 to 3, $m$ is an integer from 1 to 3 and is equal to the valence of Y. P is phosphorus. $R^4$ is like $R^3$ in all respects except that R has a valence of 2 and has in the range of from 6 to 10 carbon atoms.

The $R^3$ groups within a given phosphine catalyst or phosphonium catalyst need not be the same. In general, for effectiveness of the catalyst and solubility requirements of the catalyst in the reaction mixture, the hydrocarbyl radicals of these catalysts should be limited to the number of carbon atoms just mentioned, about 8 carbon atoms per $R^3$ radical.

Optionally, according to my invention, a catalyst adjuvant is utilized with the phosphine catalysts. Those catalyst adjuvants are monohalide compounds soluble in the reaction mixture. These adjuvants can be either organic or inorganic, and where inorganic will be an alkali metal halide such as lithium, sodium, potassium, rubidium, or cesium halide. The halide itself can be chosen from chlorine, bromide, and iodine. The catalyst adjuvants include organic monohalides such that the organic radical thereof is equivalent to $R^3$ as defined hereinabove in regard to the catalysts. It can readily be realized that a wide variety of soluble organic monohalides find usefulness as adjuvants to my catalyst.

In general, temperatures in the range of about 50° C. to about 200° C. can be employed in my reaction to form polyesters with the catalysts according to my invention. Temperatures in the range from about 90° to about 130° C. are generally preferred as I find them suitable and effective. Pressures should be sufficient to maintain the reactants and admixtures of the reactants substantially completely in the liquid phase, and usually pressures in the range of about 0.5 to about 10 atmospheres are suitable; atmospheric pressure is often a particular convenience. Reaction times sufficient to effect the polyester formation should be employed, and such times normally will fall in the range of from 10 minutes to 48 hours.

Preferably, the polyester formation should be effected substantially in the absence of water, i.e., under essentially anhydrous conditions, in order to minimize undesirable side reactions. However, minor traces of water normally present in the reactants do not interfere unduly.

The equivalent ratio of the primary halide groups to carboxylate groups of the reactants is generally in the range of 0.5:1 to 5:1 and is preferably from about 0.8:1 to 1.2:1 for most advantageous polyester formation.

Generally, from about 0.1 to 50 moles of phosphorus, as contained in the phosphine or quaternary phosphonium salt used as my catalyst, can be employed for each 100 moles of carboxylate group. Preferably in the range of 0.5 to about 10 moles per 100 moles are employed for optimum efficiency and conversion or condensation.

Where a soluble monohalide is used as a catalyst adjuvant, the amount of adjuvant so used should not exceed about 3 moles of adjuvant per mole of phosphine in the catalyst.

Upon completion of the desired degree of reaction, the resulting polyester can be recovered in any conventional manner. Any of the standard techniques known to the art, such as filtration, stripping, solvent extraction, selective precipitation, and the like, can be employed as are necessary or convenient.

The polyester polymers produced according to the method I have described exhibit an inherent viscosity of from 0.05 to 0.6, as determined in a solution of 60 weight percent phenol and 40 weight percent tetrachloroethane.

The polyesters produced according to the condensation reaction of my invention by use of my catalysts are valuable products for wide commercial use in the preparation of molded articles, and as polymers for further condensation to even higher molecular weight polymers. Suitable polyesters can be converted into the analogous epoxy compounds and employed with a variety of curing agents to form valuable adhesives, coatings, and the like.

The process of my invention and employing the catalysts according to my invention are demonstrated by the following examples. These examples should be considered as illustrative, and neither restrictive nor confining.

EXAMPLE I

To a stirred reactor was added a mixture comprised of 20 g. (gram) (0.062 mole) of disodium terephthalate, 10.8 g. (0.062 mole) of $\alpha,\alpha'$-dichloro-p-xylene, 0.8 g. (0.003 mole) of triphenylphosphine as catalyst, and 100 ml. (milliliters) of dimethylformamide as diluent. The system was flushed thoroughly with nitrogen gas. The stirred mixture was heated to 100 to 125° C. and held in this range for three hours, then subsequently cooled.

The solid precipitate which formed was washed with water, air dried, then washed with benzene twice, and again air dried. The polymeric product recovered was a white powder and weighed 15.4 grams. This constituted a 92 mole percent yield based on either the polyhalide or the polycarboxylate charged. Melting point of the polymer was 260° C. Inherent viscosity of the polymer was 0.15 in a 60 weight percent phenol-40 weight percent tetrachloroethane solution at 25° C.

This example demonstrates the direct synthesis of a polyester prepared from an alkali metal salt of a polycarboxylic acid and an organic polyhalide, using a phosphine as the catalyst.

EXAMPLE II

To a stirred reactor were added 24.2 g. (0.10 mole) of dipotassium terephthalate, 9.9 g. (0.1 mole) of 1,2-dichloroethane, 2.0 g. (0.005 mole) of ethyltriphenylphosphonium bromide as catalyst, and 150 ml. of dimethylformamide as diluent. The reactor was flushed thoroughly with nitrogen gas. The stirred mixture was heated to approximately 150° C. and held at that temperature for 3 hours, then cooled.

The precipitate formed was washed with water, dried, ground to a fine powder, washed with methanol, dried, again washed with water, and again washed with methanol. The white solid remaining was dried in vacuo at 120° C. The product yield was 17 grams of a polymer with a melting point of 235° C. and an inherent viscosity of 0.11 in a 60 weight percent phenol-40 weight percent tetrachloroethane solution at 25° C. The product constituted a yield of 90 mole percent of polymer based on either the polycarboxylate or the polyhalide charged.

EXAMPLE III

Another run was made repeating the reactants and ingredients as per Example II above with the exception that no catalyst was employed. Otherwise, all other conditions and procedures were the same. Without the use of the catalyst, only 12.9 grams of polymer were recovered which had a melting point of 200° C. and constituted a yield of only 67 mole percent based on either the polycarboxylate or the polyhalide charged.

EXAMPLE IV

In this run, there were added 11.3 g. (0.10 mole) of 1,3-dichloropropane, along otherwise with the same amounts of polycarboxylate, catalyst, and diluent as per Example II above. Only the type of polyhalide employed was changed. In this run the yield was 19.25 g. of polymer with a melting point of 200° C., constituting a yield of 94 mole percent on the same basis as previously discussed.

EXAMPLE V

To a stirred reactor were added 24.2 g. (0.1 mole) dipotassium terephthalate, 2.0 g. (0.005 mole) ethyltriphenylphosphonium bromide as catalyst, and 100 ml. dimethylformamide as diluent. This mixture was stirrred and heated to 100° C. A solution composed of 11.5 g. (0.1 mole) of bis-chloromethyl ether in 50 ml. dimethylformamide then was added slowly over a 20-minute interval. The resulting mixture was maintained at 100° C., for 4 hours, then cooled to room temperature. The precipitate formed was washed with water, dried, pulverized to a powder, washed with methanol, filtered, dried, and again washed with water, and finally again with methanol.

tetrabenzylphosphonium phosphate
tetra(3,5-dimethylphenyl)phosphonium hydrogen phosphate
tetra(4-tolyl)phosphonium dihydrogen phosphate
tetra(2-cyclopentylethyl)phosphonium nitrate
di(tetracyclopentylmethylphosphonium) terephthalate
di[tetra(3-ethylcyclohexyl)phosphonium] 1,4-benzenedisulfonate
di[tetra(2-methylcyclopentyl)phosphonium] 1,4-cyclohexanedisulfonate
di(dimethyldiphenylphosphonium) 1,10-decanedicarboxylate
di(phenyltriomethylphosphonium) 1,6-hexanedisulfonate
benzylethylmethylphenylphosphonium benzenesulfonate
tetrabenzylphosphonium octanesulfonate
tetraphenylphosphonium methanesulfonate
tetrabenzylphosphonium cyclopentanesulfonate
tetrabenzylphosphonium cyclooctanesulfonate
tetramethylphosphonium methanesulfonate and the like.

Illustrative examples of the soluble monohalides useful as adjuvants with the phosphine catalysts of my invention include:

lithium iodide
sodium bromide
potassium chloride
rubidium iodide
cesium chloride
methyl bromide
ethyl iodide
octyl chloride
butyl iodide
2-methylheptyl bromide
cyclopentyl chloride
cyclooctyl iodide
phenyl bromide
benzyl chloride
3,5-dimethylphenyl iodide
4-tolyl bromide
2-cyclohexylethyl chloride
cyclopentylmethyl iodide
3-ethylcyclohexyl bromide
2-methylcyclopentyl chloride and the like.

It frequently has been found preferable for the condensation reactions I have described to be effected in the presence of a gas which is susbtantially completely non-reactive in the reaction environment. Such gases as nitrogen, helium, neon, argon, krypton, ethane, and the like, can be employed.

The conversion or condensation reactions to prepare the polyesters according to my invention usually are effected in the absence of added diluents. However, where desired for various purposes, reaction diluents can be employed in amounts which can comprise as much as 95 percent by weight of the reaction medium. Examples of materials which can be suitably employed as diluents include such as acetone, methylethylketone, methylisobutylketone, tetrahydropyran, cyclohexanone, benzene, hexane, toluene, the xylenes, tetrahydrofuran, cyclododecanone, n-methylpyrrolidone, and the like, and even mixtures thereof.

Reasonable variations and modifications are possible within the scope of my disclosure without departing from the scope and spirit thereof.

What is claimed is:

1. A process for the production of polyesters by the reaction of at least one polycarboxylate with at least one polyhalide in the presence of an effective amount of a catalyst selected from at least one of a phosphine and a quaternary phosphonium compound; wherein said polycarboxylate is

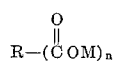

wherein $n$ is an integer of from 2 to 4, M is an alkali metal and is lithium, sodium, potassium, rubidium, or cesium, and R is an organic group having from 1 to about 200 carbon atoms; and wherein said polyhalide is $R^2X_n$ wherein X is a halogen and is chlorine, bromine, or iodine, and each said halogen is bonded to a primary carbon atom, and $R^2$ is an organic group with a valence of $n$ having in the range of from 1 to about 20 carbon atoms.

2. The process of claim 1 wherein the said organic group R is further characterized as containing from 0 to 1 substituent selected from carbonyl, alkoxy containing up to about 8 carbon atoms, nitrile, hydroxy, and aryl, and from 0 to 1 linkage selected from ether, thioether, and nitrogen wherein the nitrogen is bonded only to carbon atoms.

3. The process of claim 2 wherein the said polycarboxylate is selected from one of polycarboxylate terminated telechelic polymers, polycarboxylate terminated polyolefins, and polycarboxylate terminated polyethers.

4. The process of claim 2 wherein the said phosphine catalyst is $R_3{}^3P$ wherein $R^3$ is selected from at least one of alkyl, cycloalkyl, aryl, aralkyl, and alkaryl, and wherein each said $R^3$ contains from 1 to about 8 carbon atoms.

5. The process of claim 4 wherein the said phosphonium catalyst is $[R_4{}^3P]_mY$ wherein $m$ is an integer from 1 to 3, and Y is selected from

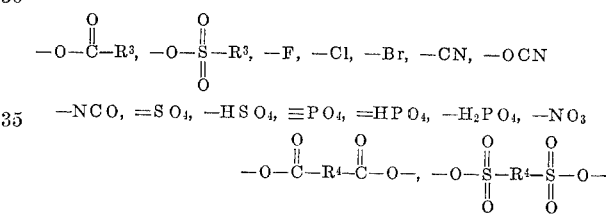

wherein $R^4$ equals $R^3$ limited to a valence of 2 and from about 6 to 10 carbon atoms per $R^4$ group.

6. The process of claim 4 wherein further is employed up to 3 moles of a soluble monohalide catalyst adjuvant per mole of said phosphine.

7. The process of claim 6 wherein said catalyst adjuvant is selected from one of (I) an alkali metal halide wherein said halide is selected from chlorine, bromine, and iodine, and said alkali metal is selected from lithium, sodium, potassium, rubidium, and cesium; and (II) an organic halide wherein the organic radical thereof equals $R^3$, and wherein in said process up to 3 moles of soluble catalyst adjuvant are employed per mole of said phosphine catalyst.

8. The process of claim 5 wherein the mole ratio of said polyhalide to said polycarboxylate is in the range of 0.5:1 to 5:1, the amount of said catalyst is from about 0.1 to 50 moles per 100 moles of said polycarboxylate, and the inherent viscosity of said polyester is from about 0.05 to about 0.6.

9. The process of claim 8 wherein said reaction is effected in the presence of a substantially inert diluent gas, and the conditions of said reaction include a reaction time of from about 10 minutes to about 48 hours, a reaction pressure of from about 0.5 to about 10 atmospheres, and a temperature of from about 50 to about 200° C.

10. The process of claim 9 wherein said reaction is further conducted in the presence of a reaction diluent in an amount up to about 95 percent by weight of the total weight of reactants and wherein said reaction diluent is selected from acetone, methylethylketone, methylisobutylketone, tetrahydropyran, cyclohexane, benzene, hexane, toluene, xylene, tetrahydrofuran, cyclododecanone, n-methylpyrrolidone, N,N-dimethylformamide, and mixtures thereof.

The resulting polymer was pulverized, dried in vacuo at 120° C., and the yield was 18.0 g. of a white polymer with a melting point of 195° C. The calculated yield based upon the weight obtained was 88 mole percent based on either the polycarboxylate or the bis-chloromethyl ether charged.

EXAMPLE VI

The same ingredients as given in Example II above were used, under identical concentrations and time elements, however using a temperature of 175° C. With this change in temperature, a polymer was recovered in a yield of 18.2 grams. The polymer had a melting point of 240° C. and constituted a 95 mole percent yield based on either the polycarboxylate or polyhalide charged. This example shows synthesis of a polyester according to the invention, though at a higher reaction temperature than that used in Example II above.

The following paragraphs contain examples of reactants and of the catalysts as represented by the general formulas given previously. Such examples should not be considered limiting in any way, but only illustrative of the reactant types useful according to my invention.

Examples of the alkali metal polycarboxylates

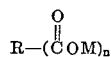

which can be employed according to the process of my invention include:

disodium terephthalate
dipotassium terephthalate
tripotassium 1,2,3-benzenetricarboxylate
trisodium 1,2,4-benzenetricarboxylate
trilithium 1,2,4-benzenetricarboxylate
tripotassium 1,2,4-benzenetricarboxylate
tetrapotassium 1,2,3,4-benzenetetracarboxylate
tetrasodium 1,2,4,5-benzenetetracarboxylate
tetrapotassium 1,2,3,5-benzenetetracarboxylate
disodium 1,8-octanedicarboxylate
trisodium 1,3,6-hexanetricarboxylate
disodium 1,4-cyclohexanetricarboxylate
tripotassium 1,3,6-cyclohexanetricarboxylate
tetrasodium 1,2,6,8-octanetricarboxylate
tetrasodium 1,2,4,5-cyclooctanetetracarboxylate
disodium methanedicarboxylate
tripotassium 1,2,3-propanetricarboxylate
disodium carboxylate terminated polybutadiene (MW–1000)[1]
dipotassium carboxylate terminated polyisoprene (MW–500)[1]
dilithium 1,20-eicosanedicarboxylate
disodium 10,10-dioctyloxy-1,20-eicosanedicarboxylate
dipotassium 4-benzyloxy-6-(4-pyridyl)-1,60-hexacont-10-enedicarboxylate
dilithium 2,4,6,10-tetra(2-butenyl)-3,5,12,13-tetracyano-11,14,16,17-tetrahydroxy-18,19,20,21-tetraethylthio-1,50-pentacontanedicarboxylate
disodium 4,6-diformyl-10,11-di(dimethylamino)-15-[3-(1-ethylpyrrolyl)]-1,40-tetracontanedicarboxylate and the like.

Some examples of the polyhalides $R^2X_n$ which can be employed according to the process of my invention include:

dichloromethane
1-bromo-2-chloroethane
α,α'-dichloromethyl ether
β,β'-dibromoethyl ether
α,α'-dichloro-p-xylene
1,2-dichloroethane
1,8-diiodooctane
1,2,3-tribromopropane
1,3,6-trichlorohexane
1,3,6-triiodocyclohexane 1,2,6,8-tetrabromooctane
1,2,4,5-tetrachlorocyclooctane
1,20-dichloroeiosane
1,2,19,20-tetrachloroeicosane
1,2-dibromo-4-benzyloxy-5-(4-pyridyl) octane
2,4-di(2-butenyl)-1,10-dichloro-3,5-dicyanodecane
1,10-dichloro-t-ethylthio-3-dodecene
1,9-dibromo-3,5-diformyl-7-hydroxynonane
1,8-dichloro-2,6-di(diethylamino)-octane
1,2,8-trichloro-4-[3-(1-ethylpyrrolyl)] octane
1,6-dichloro-2,3-dihydroxyhexane and the like.

Examples of the catalyst type $R_3^3P$, the phosphines, are given below. Since it is unnecessary for the $R^3$ groups to be the same, dimethylethyl phosphine, diphenylethyl phosphine, and the like, are encompassed by these catalysts in the condensation reaction of my invention. Further examples of suitable phosphines include:

trimethylphosphine
triethylphosphine
trioctylphosphine
tri(2-methyl)phosphine
tricyclopentylphosphine
tricyclooctylphosphine
triphenylphosphine
tribenzylphosphine
tri(3,5-dimethylphenyl)phosphine
tri(4-tolyl)phosphine
tri(2-cyclohexylethyl)phosphine
tricyclopentylmethylphosphine
tri(3-ethylcyclohexyl)phosphine
tri(2-methylcyclopentyl)phosphine
butylethylmethylphosphine
butylcyclohexylphenylphosphine
diethylphenylphosphine
dicyclohexylethylphosphine and the like.

Examples of the quaternary phosphonium salts $$[R_4^3P]_mY$$

which can be employed as catalysts include:

ethyltriphenylphosphonium benzoate
tetramethylphosphonium formate
tetraethylphosphonium acetate
tetraoctylphosphonium octanoate
tetra(2-methylhexyl)phosphonium cyclooctane carboxylate
tetracyclopentylphosphonium cyclopentane carboxylate
tetracyclooctylphosphonium butanoate
tetraphenylphosphonium hexanoate
tetrabenzylphosphonium benzoate
tetra(3,5-dimethylphenyl)phosphonium-3,5-dimethylbenzene carboxylate
tetra(4-tolyl)phosphonium-4-toluene carboxylate
tetra(2-cyclohexylethyl)phosphonium-2-cyclohexyl acetate
tetracyclopentylmethylphosphonium-2-ethylcyclohexane carboxylate
tetra(3-ethylcyclohexyl)phosphonium benzoate
tetra(2-methylcyclopentyl)phosphonium benzoate
dimethyldiphenylphosphonium benzoate
phenyltrimethylphosphonium formate
benzylethylmethylphenylphosphonium benzoate
tetrabenzylphosphonium benzoate
tetraphenylphosphonium benzoate
ethyltriphenylphosphonium chloride
tetramethylphosphonium fluoride
tetraoctylphosphonium bromide
tetra(2-methylheptyl)phosphonium cyanide
tetracyclopentylphosphonium cyanate
tetracyclooctylphosphonium isocyanate
tetraphenylphosphonium sulfate
tetrabenzylphosphonium hydrogen sulfate

[1] MW=approximate molecular weight.

11. The process of claim 8 wherein the said polyhalide is a dihalide, and the said polycarboxylate is a dicarboxylate.

12. The process of claim 11 wherein the said dihalide is α,α'-dichloro-p-xylene, the said dicarboxylate is disodium terephthalate, and the said phosphine catalyst is triphenylphosphine.

13. The process of claim 11 wherein the said dihalide is dichloroethane, the said dicarboxylate is dipotassium terephthalate, and the said phosphonium catalyst is ethyltriphenyl phosphonium bromide.

14. The process of claim 11 wherein the said dihalide is bis-chloromethyl ether, the said dicarboxylate is dipotassium terephthalate, and the said phosphonium catalyst is ethylthriphenylphosphonium bromide.

References Cited

UNITED STATES PATENTS

| 2,687,427 | 8/1954 | Fields | 260—485 |
| 3,254,057 | 5/1966 | Davis | 260—78.4 |

OTHER REFERENCES

Royals, E. E.: Advanced Organic Chem., Prentice Hall (N.J.), 1959, pp. 604, 605.

JAMES A. SEIDLECK, Primary Examiner

J. KIGHT III, Assistant Examiner

U.S. Cl. X.R.

252—426, 437